United States Patent [19]

Ohmi

[11] 4,200,029
[45] Apr. 29, 1980

[54] DIAPHRAGM BRAKE BOOSTER

[75] Inventor: Atushi Ohmi, Anjo, Japan

[73] Assignee: Aisin Seiki Kabushiki Kaisha, Kariya, Japan

[21] Appl. No.: 903,129

[22] Filed: May 5, 1978

[30] Foreign Application Priority Data

May 6, 1977 [JP] Japan .................. 52-57721[U]

[51] Int. Cl.² ........................................... F15B 9/10
[52] U.S. Cl. .............................. 91/369 A; 91/376 R
[58] Field of Search ............ 91/369 A, 369 B, 369 R, 91/376 R

[56] References Cited

U.S. PATENT DOCUMENTS

| | | | |
|---|---|---|---|
| 3,470,697 | 10/1969 | Pech et al. .................. | 91/369 R |
| 3,688,647 | 9/1972 | Kytta ........................... | 91/376 R |
| 3,754,450 | 8/1973 | Kytta ........................... | 91/369 A |
| 4,043,251 | 8/1977 | Ohmi ........................... | 91/376 R |

FOREIGN PATENT DOCUMENTS 964289 7/1964 United Kingdom .................. 91/369 A

*Primary Examiner*—Paul E. Maslousky
*Attorney, Agent, or Firm*—Finnegan, Henderson, Farabow, Garrett & Dunner

[57] ABSTRACT

A diaphragm brake booster includes a housing, a movable power piston disposed in the housing, a diaphragm inner periphery thereof being secured to the power piston, a valve member disposed in the power piston for generating a pressure differential between the two chambers defined by the power piston and the diaphragm upon manual operation. The brake booster further includes a key member for restricting the movement of the valve member, the key member being supported on the power piston near the portion where the inner periphery of the diaphragm is secured.

3 Claims, 2 Drawing Figures

DIAPHRAGM BRAKE BOOSTER

This invention relates to a brake booster and more particularly to a diaphragm brake booster for vehicles.

In a vehicle brake system using such a brake booster, the master cylinder and the brake booster must be arranged in aligned relation to each other in the axial direction due to the functional reasons thereof. However, the space for provision of such brake apparatus as master cylinder and brake booster is severely restricted, and it is necessary to reduce the longitudinal length of the brake booster or master cylinder.

It is, therefore, an object of the present invention to provide a diaphragm brake booster of reduced axial length.

According to the present invention, a key member, which is used for preventing a valve member from excess axial movement, is supported on the reduced diameter portion of a power piston member near the diaphragm securing position so that the axial length for the key member may not be extended and the axial length of a booster housing may be reduced.

Figure 1:
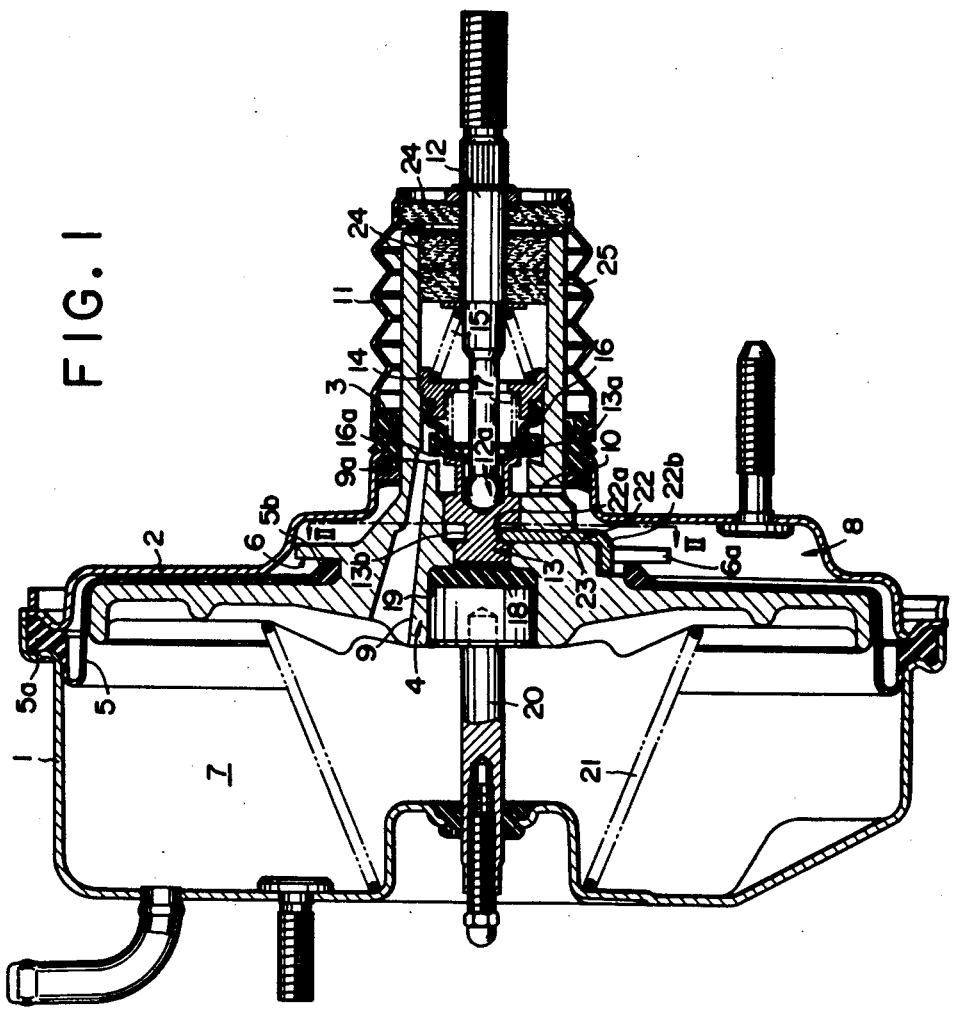
FIG. 1 is a cross sectional view of the present invention.
Figure 2:
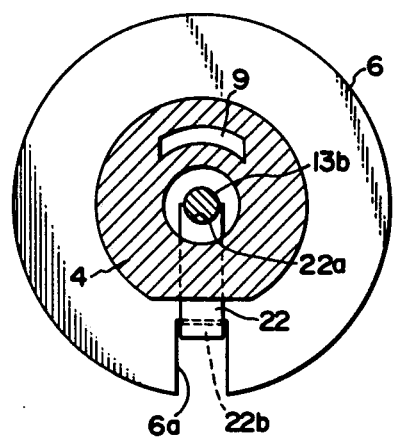
FIG. 2 is a view taken along an arrow II—II of FIG. 1.

Referring now to the attached drawings, a booster housing includes two shell sections 1 and 2 that are conventionally joined at the opposed outer peripheries thereof and compress a bead 5a of a diaphragm 5 therebetween. Section 1 is provided with a central opening that locates a seal while the section 2 is provided with a similar central opening that locates a seal 3 which serves as a sliding guide for a power piston or movable wall 4. The power piston 4 includes an annular groove 6 in which is received an inner peripheral brim 5b of the diaphragm 5 so that the interior of the booster housing is divided into two chambers 7, 8 by the diaphragm 5 and the power piston 4. One chamber 7 is connected to a vacuum source (not shown) for always introducing therein vacuum pressure while the other chamber 8 normally communicates with chamber 7 through passages 9 and 10 provided at the power piston 4 but may be connected to the atmosphere when an air valve is operated, the operation of which will be described hereinafter.

The power piston 4 further includes an outward extension 25, the outer periphery thereof being slidably guided by the seal 3. Such sliding portion of the outward extension 25 is protected by a bellow type dust boot 11 covering the extension 25 and connecting with the seal 3. A push rod 12 extending outwardly from the interior of the extension 25 of the power piston 4 is operatively connected to a brake pedal or the like (not shown) for operating the booster upon axial movement thereof. The inner end of the rod 12 is provided with a ball head 12a operatively engaged with a plunger 13 which is also disposed in the interior of the power piston 4 in aligned relation to the push rod 12.

A disc-like plate 14 is placed within the interior of the extension 25 of the power piston 4 and is biased to the left as viewed in FIG. 1 by spring 15. The disc-like plate 14 includes a seal member 16 the inner face 16a of which serves as a valve seat member of the air valve assembly. The inner face of the valve seat member 16a is in sealing contact with one end surface 13a of the plunger 13 by the force of spring 17. An inner wall 9a of the power piston 4 is engageable with the valve seat member 16a of the seal member 16 for interrupting communication between two chambers 7 and 8 through passages 9 and 10.

A reaction disc 18 made of an elastic material, such as, rubber, is disposed in a recess 19 of the power piston 4 and one side of the reaction disc 18 faces and is engageable with the inner end of the plunger 13. Numeral 20 designates a master cylinder push rod one end of which is connected with the power piston 4 for simultaneous movement therewith and the other end of which is slidably guided by the seal provided at the central opening of the section 1 of the booster housing. A spring 21 is disposed within the chamber 7 for biasing the power piston 4 toward right as viewed in FIG. 1.

The plunger 13 is axially movable relative to the power piston upon axial movement of the push rod 12 but the axial movement of the plunger 13 is limited by a fork-type key 22 radially inserted into the plunger 13 through a radial recess 23 of the power piston 4. A fork portion 22a of the key 22 receives a reduced diameter portion 13b of the plunger 13. The reduced diameter portion 13b of the plunger 13 is designed to have a sufficient axial length so that the plunger 13 is axially movable for valve opening and closing operation.

As apparent from the drawings, since the key 22 is arranged adjacent to the extension 25, a portion of extension 25 between the key and the passage 10 can be reduced in diameter, the total length of the power piston 4 is smaller. The fork portion 22a of the key 22 restricts a further axial movement of the plunger 13 by abutting shoulders of the large diameter portions of the plunger 13. The key 22 has an axially bent portion 22b at the lower end for being inserted into the annular groove 6 of the power piston 4. The annular groove 6 has an undercut portion 6a for inserting the bent portion 22b of the key 22. Thus inserted bent portion 22b is supported by the inner peripheral brim 5b of the diaphragm 5 so as not to be dropped down.

In other words, the key 22 is of L-shaped plate and has the fork portion 22a for preventing excess axial movement of the plunger 13 and the axial bent portion 22b for supporting the key 22 on the power piston 4.

In operation, when the push rod 12 is operated by the brake pedal to move to the left, the plunger 13 is then moved to the left. Simultaneously the seal member 16 is followed to move to the left by the biasing force of spring 17 maintaining the valve seat 16a to be in contact with the right end 13a of the plunger 13. This leftward movement of the seal member 16 is prevented when the valve seat 16a engages with the inner wall 9a of the power piston 4 to interrupt communication between the chambers 7 and 8.

Further leftward movement of the plunger 13 will release the engagement between the valve seat 16a and the right end 13a of the plunger 13 thereby to introduce air into the chamber 8 through air filters 24. Then a pressure differential will prevail across the two chambers 7 and 8. Therefore, the power piston 4 initiates movement to the left overcoming the biasing force of the spring 21 thereby the move the master cylinder push rod 20 to the left to cause the master cylinder (not shown) to generate brake pressure for brake operation. Reaction pressure on the rod 20 will deform the elastic reaction disc 18 to abut plunger 13 providing reaction which opposes the valve opening movement of the rod 12. After a desired braking effort is achieved, forward axial movement of the rod 12 is stopped, following which the right end of the plunger 13 engages with the valve seat 16a thereby preventing further air flow into the chamber 8.

When it is desired to reduce the force generated by the booster, the force applied to the rod 12 is reduced, whereupon the valve seat 16a is out of engagement with the inner wall 9a of the power piston 4 and complete removal of force of the push rod 12 permits the valve seat 16a to assume the position in FIG. 1 to equalize the vacuum in two chambers 7 and 8.

I claim:

1. A diaphragm brake booster comprising:

a housing;

a diaphragm having a central opening disposed in the said housing and axially movable within said housing;

a power piston having an integral annular flange defining a power piston annular groove for receiving therein the inner periphery of the central opening of said diaphragm, said power piston and diaphragm defining first and second chambers, said first chamber being always connected to a vacuum source and said second chamber being normally connected to said first chamber through fluid passage means provided in said power piston, said annular flange having a radial slot;

air passage means provided in said power piston and connectable to said second chamber;

valve means disposed in said power piston between said air passage means and fluid passage means for preventing fluid communication between said fluid passage means and said second chamber and thereafter for introducing atmospheric pressure into said second chamber;

an operator-operated means for actuating said valve means in response to manual operation;

said valve means including a plunger having a plunger annular groove defining a reduced diameter portion of said plunger, being operatively engaged with said operator-operated means and axially movable relative to said power piston;

a key member including a radially extending portion and an axially extending portion, said radially extending portion disposed in said power piston and engaging said plunger at said reduced diameter portion, the thickness of said radially extending portion being less than the width of said plunger annular groove for preventing excess axial movement of said plunger, said axially extending portion extending through said radial slot for abutting and being supported by said power piston in said power piston annular groove between said power piston and the inner periphery of said diaghragm central opening.

2. A diaphragm brake booster of claim 1 wherein said radially extending portion of said key member is provided with a forktype upper end for engaging with said reduced diameter portion of said plunger.

3. A diaphragm brake booster of claim 1 wherein said reduced diameter portion of said plunger is provided at the middle portion thereof.

* * * * *